United States Patent
Renn et al.

Patent Number: 5,702,337
Date of Patent: Dec. 30, 1997

[54] ROLL ARRANGEMENT

[75] Inventors: Sandra Renn; Wolf Gunter Stotz, both of Ravensburg, Germany

[73] Assignee: Voith Sulzer Papiermaschinen GmbH, Heidenheim, Germany

[21] Appl. No.: 493,879

[22] Filed: Jun. 21, 1995

[30] Foreign Application Priority Data

Jul. 1, 1994 [DE] Germany ............ 44 23 212.8

[51] Int. Cl.$^6$ ............................................. B23P 15/00
[52] U.S. Cl. ............................. 492/7; 492/16; 492/17
[58] Field of Search ................... 492/7, 2, 16, 17, 492/70

[56] References Cited

U.S. PATENT DOCUMENTS

| | | | |
|---|---|---|---|
| 3,726,338 | 4/1973 | Sorenson | 492/7 |
| 4,058,878 | 11/1977 | Lehmann | 492/7 |
| 4,381,588 | 5/1983 | Biondetti | 492/7 |
| 5,206,978 | 5/1993 | Pav | 492/7 |

FOREIGN PATENT DOCUMENTS

| | | |
|---|---|---|
| 3042616 | 4/1983 | Germany |
| 3317974 | 11/1988 | Germany |
| 4012805 | 5/1991 | Germany |
| 4133562 | 4/1993 | Germany |

*Primary Examiner*—Irene Cuda
*Attorney, Agent, or Firm*—Townsend and Townsend and Crew LLP

[57] ABSTRACT

A roll arrangement with a rotatable roll jacket, in particular an elastic roll jacket, a rotationally fixed carrier, and at least one support arrangement disposed between the roll jacket and the carrier, with the support arrangement having a foot associated with the carrier and a sliding shoe supported on the foot and movable radially relative to the roll jacket, with the sliding shoe having a support surface associated with the roll jacket which, in operation, always ensures good contact of the support surface of the sliding shoe against the roll jacket to be supported in that the foot is displaceably supported on the carrier and the support arrangement is made of at least two-part design and contains a tilting support which permits tilting of the sliding shoe relative to the carrier.

34 Claims, 5 Drawing Sheets

ROLL ARRANGEMENT

BACKGROUND OF THE INVENTION

The invention relates to a roll arrangement comprising a rotatable roll jacket, in particular an elastic roll jacket, a rotationally fixed carrier, and at least one support arrangement disposed between the roll jacket and the carrier, the support arrangement having a foot associated with the carrier and a sliding shoe journalled on the foot and movable in the radial direction relative to the roll jacket, the sliding shoe having a support surface associated with the roll jacket.

Such roll arrangements are known and are frequently used for the treatment of paper webs and in particular in the dewatering and smoothing sections of paper machines. They have support arrangements with sliding shoes which are movable in the radial direction relative to the roll jacket in order to exert a supporting force on the roll jacket. With this arrangement the sliding shoes arranged alongside one another in the axial direction of the roll jacket can be loaded with different pressures in order to be able to differentially set the support forces exerted on the roll jacket in the axial direction of the roll jacket and thus to differentially preset the pressing force acting over the width of the roll gap or nip.

A hydrostatic support element which can be used for such roll arrangements is known from DE 33 17 974 C2 and includes a pressure piston having a pressure space supplied with pressure medium and a support or sliding shoe which is movably journalled on the pressure piston, with a pressure chamber connected to the pressure space being formed in the pressure piston and the sliding shoe and communicating via at least one restrictor bore with at least one pressure pocket provided in the running surface of the sliding shoe. The pressure piston has at least two pressure chambers each for receiving a respective sliding shoe with the sliding shoes being tiltable relative to one another in the support direction and being movable independently of one another.

It is required of roll arrangements of this kind that a predetermined pressing force distribution can always be guaranteed over the width of the press gap or nip with different operating conditions. This requires a design of the support arrangement which ensures that even with deformations of the roll jacket, which in some cases are pronounced, disturbing changes of the supporting forces exerted by the support arrangement on the roll jacket over the width of the press gap do not occur. This is necessary because support force fluctuations can lead, for example in the smoothing sections of paper machines, to fluctuations in the smoothness over the width of the paper web which can represent quality deficiencies which lead to the paper being unmarketable.

SUMMARY OF THE INVENTION

The object of the invention is to provide a roll arrangement of the initially named kind which, in operation, always ensures a good quality paper and full area contact of the lubricated support surface of the respective sliding shoe on the roll jacket to be supported and which also avoids the occurrence of jamming tendencies between neighboring sliding shoes.

This object is satisfied essentially in that the foot displaceably supported at the carrier and the support arrangement is of at least two-part construction and contains a tilting support or bearing which ensures a tilting of the sliding shoe relative to the carrier.

Through these measures it is ensured that the sliding shoe is, on the one hand, displaceable relative to the carrier and can, on the other hand, also execute tilting movements so that a free movability of the sliding shoe relative to the carrier is ensured and so that the sliding shoe can, in operation, ideally adapt to the respective shape of the roll jacket without the danger existing that its support surface partly looses contact with the roll jacket. This means that support force fluctuations which could lead to an undesired change of the pressing force distribution in the axial direction of the roll jacket are prevented.

In the event that several sliding shoes are present it is important that the axial position or the position in the circumferential direction of the respective sliding shoe depends on that of the neighboring sliding shoe in that the distance between the sliding shoes is mechanically determined. This signifies that the sliding shoes can be connected together, can border on one another, or can have a fixed spacing, which is of particular advantage with elastic roll jackets. With sliding shoes which are connected together, a one-piece form of the sliding shoe is also possible as an alternative in the form of a strip which extends over several feet.

Manufacturing dependent tolerances, temperature changes or bending effects lead, in particular when cumulative, to a displacement of the sliding shoes relative to their feet. In order to preclude jamming which may arise between the sliding shoe, the foot and the carrier it is important that the foot, which in known arrangements is customarily fixed to the carrier, is displaceably supported on the carrier in accordance with the invention, and that the at least two-part support arrangement contains a tilting support or bearing which ensures the sliding shoe can tilt relative to the carrier.

In accordance with an advantageous embodiment of the invention a first pressure space is formed between the sliding shoe and the foot and a second pressure space is provided between the foot and the carrier, with the two pressure spaces communicating with one another and with the effective surfaces of the two pressure chambers being so dimensioned and matched to one another that at least the surface pressure between the foot and the carrier is reduced. This provides the necessary displaceability of the foot relative to the carrier. The precondidition for this is that the foot, on the occurrence of movements of the sliding shoe, can in each case suitably adjust to the new position and that no strains or jamming can occur which would have negative effects on the uniform and full area contact of the sliding shoe at the roll jacket.

Advantageous manners of operation can likewise be obtained through the positioning of the tilting support in the region between the sliding shoe and the carrier in a manner matched to the respective application.

DETAILED DESCRIPTION OF THE PREFERRED EXEMPLARY EMBODIMENTS

Figure 1:
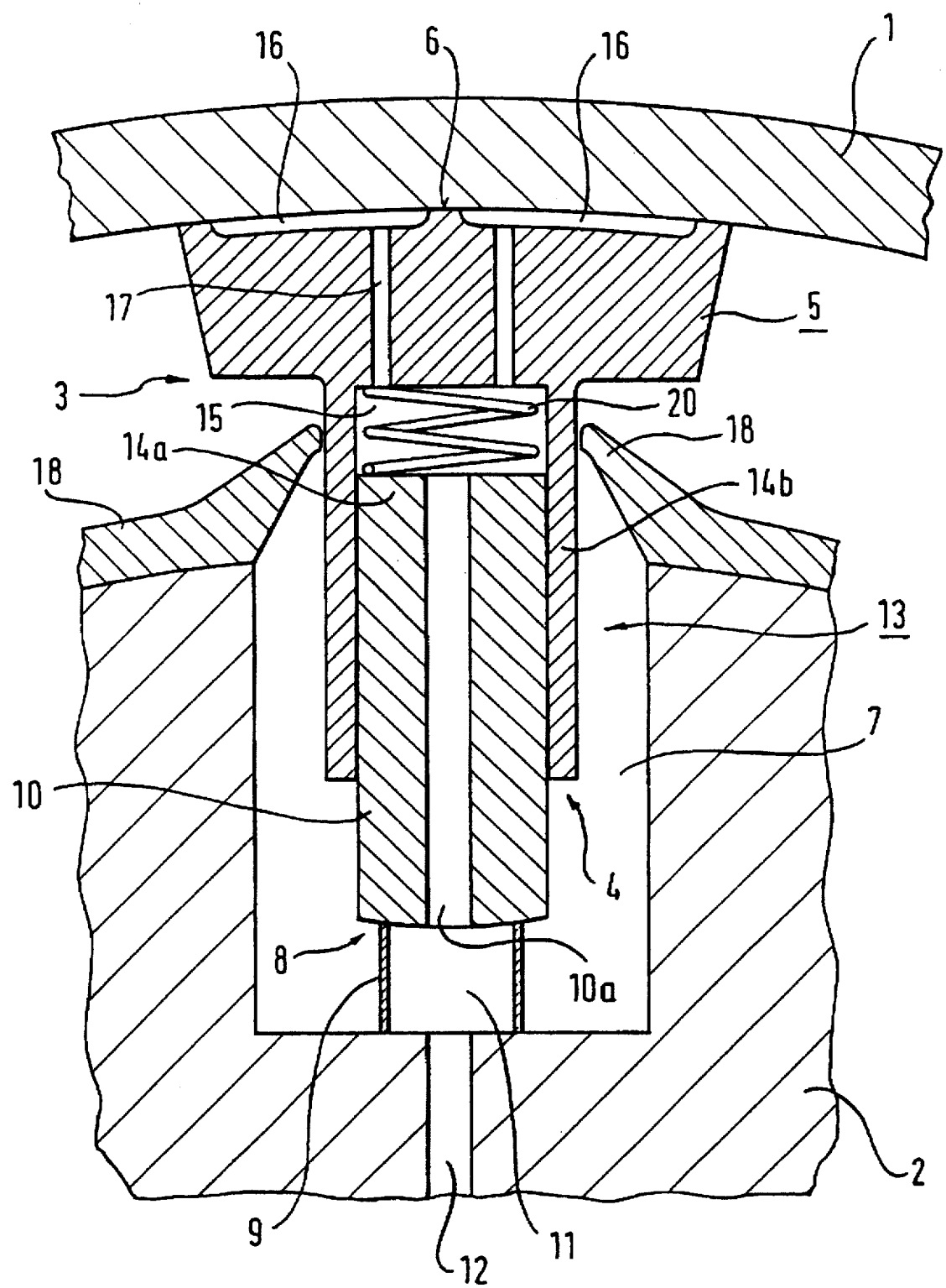
FIG. 1 ia a sectional illustration of a partial view of a first embodiment of a roll arrangement in accordance with the present invention in FIG. 2 is a sectional illustration of a partial view of a second embodiment of a roll arrangement.

In the figures, components which correspond to one another are provided with the same reference numerals.

The embodiment of a roll arrangement in accordance with the invention as illustrated in FIG. 1 includes a roll jacket 1 which is arranged around a stationary carrier 2 and which is rotatable relative to the latter, if desired, by way of a non-illustrated drive means. A support arrangement 3 is provided between the roll jacket 1 and the carrier 2 and includes a foot or base part 4 associated with the carrier 2 and also a sliding shoe 5 having a support surface associated with the roll jacket 1 which is mounted on the foot 4 and is movable relative to the latter in the radial direction relative to the roll jacket 1. The support arrangement 3 is arranged in a recess 7 of the carrier 2 out of which the sliding shoe 5 projects.

The support arrangement contains a tilting support 8 which is provided in the region of the foot 4 and divides the foot 4 into a sliding foot 9 which is supported against the carrier 2 and is displaceable relative to the latter and a cylinder or sleeve part 10 at the roll jacket side. The sleeve part 10 is provided at the carrier side with a spherically shaped bearing surface which cooperates with the sliding foot 9 formed as a thin-walled sleeve and ensures that the sleeve part 10 is tiltable relative to the sliding foot 9. The sleeve part 10 and the sliding foot 9 of the foot 4 form a pressure chamber 11 together with the carrier 2 which is connected to a pressure medium line 12 provided in the carrier 2.

Between the foot 4 and the sliding shoe 5 there is provided a piston-in-cylinder unit as a stressing or loading unit 13. The piston-in-cylinder unit is formed by the roll jacket end of the sleeve part 10 acting as the piston part 14a and a cylinder part 14b formed on the sliding shoe 5 at the carrier end, with the cylinder part 14b being mounted onto the piston part 14a and being movable relative to the latter in the radial direction relative to the roll jacket 1. The pressure space 15 of the piston-in-cylinder unit hereby formed between the foot 4 and the sliding shoe 5 communicates via the inner space 10a of the sleeve part 10 or via a bore with the carrier side pressure space 11, preferably in a non-restricted manner.

The effective areas of the pressure chambers 11, 15 formed at the end faces of the sleeve part 10 are so matched to one another and so dimensioned, i.e. the effective area at the roll jacket side is selected to be so much larger than the effective area at the carrier side, that the surface pressure which arises between the sliding foot and the carrier 2 admittedly permits a displacement of the support arrangement 3 relative to the carrier 2 but at least substantially prevents the escape of the pressure medium present in the pressure chamber 11. The surface pressure is selected in an advantageous manner so that a thin lubricant film can form between the sliding foot 9 and the carrier 2.

Pressure pockets 16 are provided in the support surface 6 of the sliding shoe 5 for the hydrostatic support of the roll jacket 1 and are connected via restrictor bores 17 in the sliding shoe 5 with the pressure space 15 of the piston-in-cylinder unit.

Guide strips 18 are provided on the carrier 2 at the jacket side. The guide strips 18 support the support arrangement 3 at both sides in the circumferential direction of the roll jacket and prevent the support arrangement 3 being taken along on rotation of the roll jacket 1. The support arrangement 3 need not involve a separate guide strip 18 but rather this guide strip can also be formed in one piece with the carrier 2 or be machined out of the carrier 2.

Figure 2:
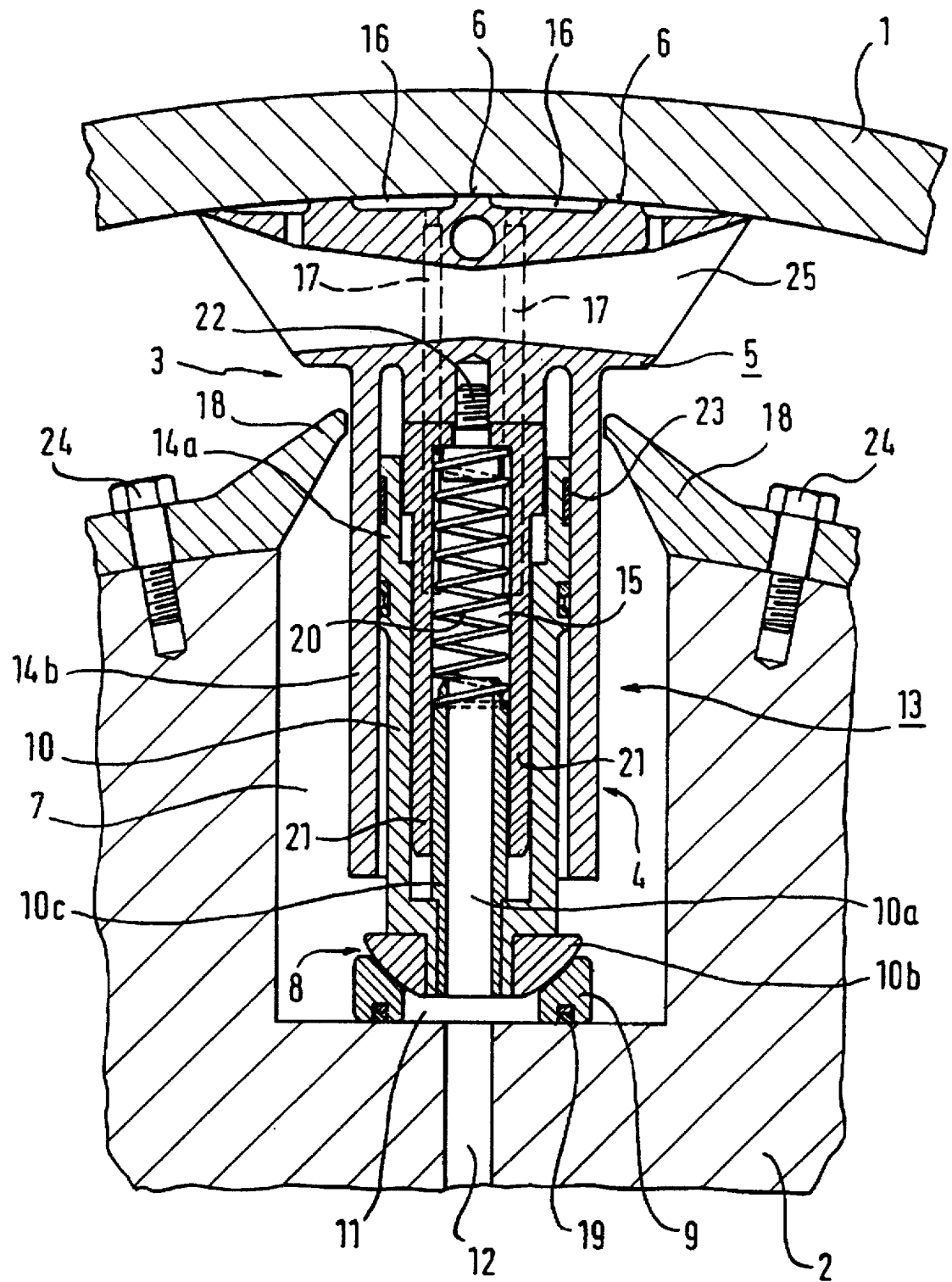

FIG. 2 shows a further embodiment of a roll arrangement in detail which is built up in similar manner to the embodiment shown in FIG. 1. This roll arrangement includes a roll jacket 1 and a carrier 2 between which a support arrangement 3 is provided. This support arrangement is braced with its foot or base part 4 in a recess 7 of the carrier 2 and has a sliding shoe 5 with a support surface 6 associated with the roll jacket 1. The sliding shoe is displaceably held on the foot 4 so that it is displaceable in the radial direction relative to the roll jacket 1.

A tilting support 8 is provided in the region of the foot 4 which subdivides the foot 4 into a sliding foot 9 which is supported against the carrier 2 and is displaceable relative to the latter and a sleeve part 10 at the roll jacket end. For the formation of the tilting bearing 8 the sleeve part 10 has a head part 10b at the carrier end on which a spherical bearing surface is formed and the latter stands in engagement with a support surface of the sliding foot 9 of complementary shape.

The sliding foot 9 and the head part 10b form, with the carrier 2, a pressure space 11, and a pressure medium bore 12 extending in the carrier 2 opens into this pressure space. A sealing element 19 is provided between the sliding foot 9 and the carrier 2 in order to prevent the escape of pressure medium from the pressure space 11.

The support arrangement 3 further includes a stressing unit 13 having a piston-in-cylinder unit with a piston part 14a formed at the roll jacket end of the sleeve part 10 engaging into a cylinder 14b provided at the sliding shoe 5 at the carrier side. A compression spring 20 is provided in the pressure space 15 of the piston-in-cylinder unit which is formed in this way between the foot 4 and the sliding shoe 5, and the compression spring expandingly pre-loads the support arrangement 3. The pressure spring 20 is braced between a spigot part 10c provided at the center in the sleeve part 10 and the sliding shoe 5 and is guided at the outer side in the pressure space 15 by a guide sleeve 21 which is secured to the sliding shoe 5 by a screw 22. The guide sleeve 21 is held in the sleeve part 10.

Between the piston part 14a and the cylinder 14b of the piston-in-cylinder unit there is provided a sealing element 23 which prevents the escape of pressure medium from the pressure space 15.

The pressure spaces 11, 15 which are provided between the foot 4 and the carrier 2, on the one hand, and between the foot 4 and the sliding shoe 5, on the other hand, are connected together through the inner space 10a of the sleeve part 10. The effective areas of the pressure spaces 11, 15 are so dimensioned and matched to one another, as in the embodiment shown in FIG. 1, that the surface pressure between the sliding foot 9 and the carrier 2 permits a displacement of the support arrangement 3 relative to the carrier 2 but essentially prevents the emergence of pressure medium from the pressure space 11.

Pressure pockets 16 are provided in the support surface 6 of the sliding shoe 5 which are connected via restrictor bores 17 provided in the sliding shoe 5 to the pressure space 15 of the piston-in-cylinder unit.

Guide strips 18 are secured to the carrier 2 by screws 24 on both sides of the support arrangement 3 and support the support arrangement 3 sideways in the circumferential direction of the roll jacket 1 and prevent the support arrangement 3 being taken along in the direction of rotation of the roll jacket.

A channel 25 extending substantially in the circumferential direction of the roll jacket is further provided in the sliding shoe 5. A medium can be conducted through the channel 25 for temperature compensation of the sliding shoe 5 in order to ensure that the respective sliding shoe has a substantially uniform temperature.

Figure 3:
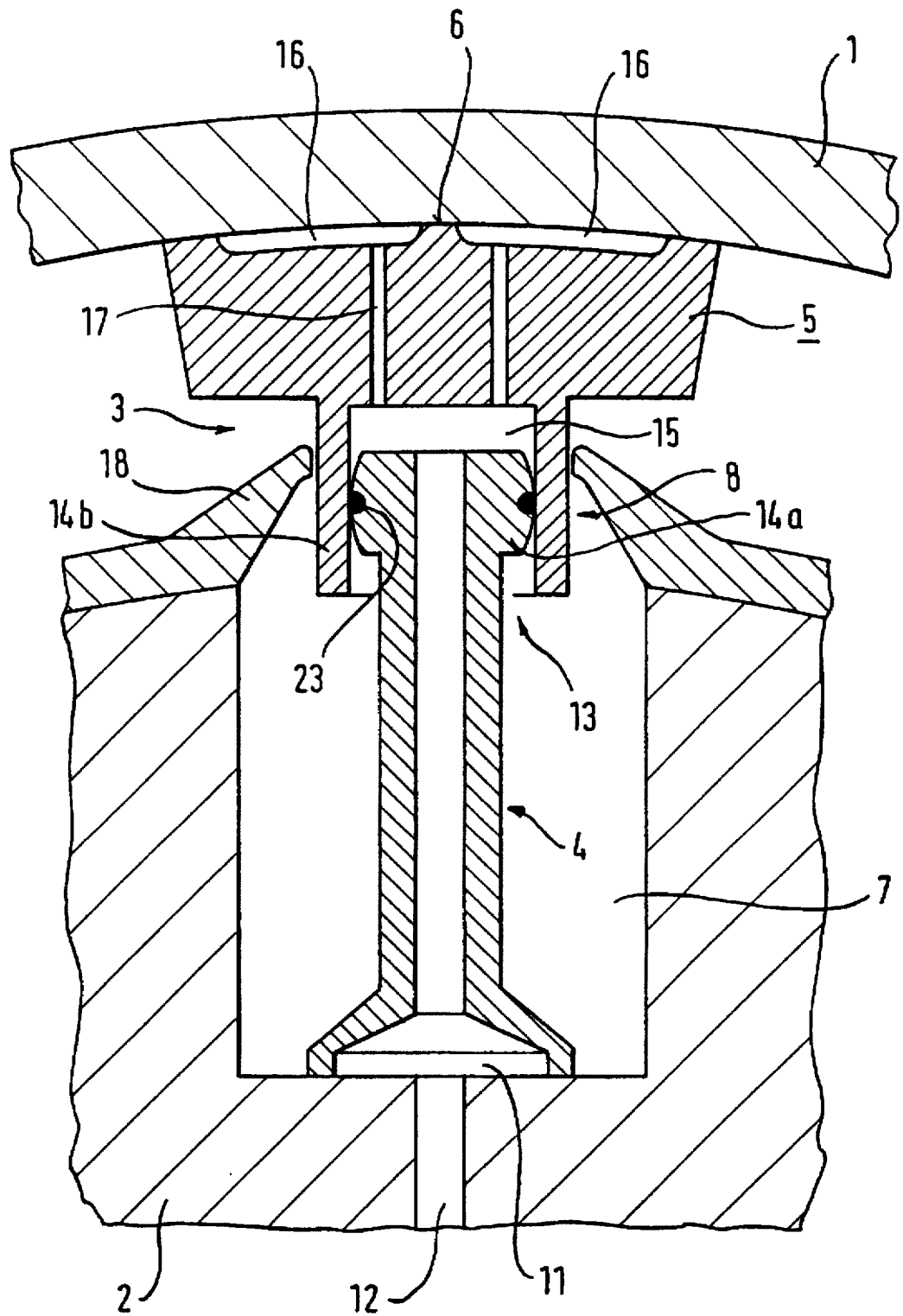
FIG. 3 is a sectional illustration of a partial view of a third embodiment of a roll arrangement.

FIG. 3 shows a further roll arrangement in which a support arrangement 3 is disposed between a roll jacket 1 and a carrier 2 in a recess 7 of the carrier 2. The support arrangement 3 has a foot or base part 4 which is supported against the carrier 2 and is displaceable relative to the latter. The foot 4 and the carrier 2 form a pressure space 11 between them, and a pressure medium bore 12 provided in the carrier 2 opens into this pressure space. The roll jacket end of the foot 4 is formed as a piston part 14a which engages into a cylinder 14b formed on the sliding shoe 5 at the carrier side and which forms, together with the latter, a piston-in-cylinder unit of a stressing unit 13.

The pressure space 15 which is formed by the piston-in-cylinder unit between the foot 4 and the sliding shoe 5 is fluidly connected to the pressure space 11 between the foot 4 and the carrier 2, preferably in a manner free of restriction. The effective surfaces directed towards one another of the two pressure spaces 11, 15 which are connected together are so dimensioned and matched to one another that a reduced surface pressure between the foot 4 and the carrier 2 permits a displacement of the support arrangement relative to the carrier 2 without permitting an undesired escape of pressure medium out of the pressure space 11.

A tilting support 8 is formed between the piston part 14a formed on the foot 4 and the cylinder part 14b provided on the sliding shoe 5. A sealing element 23 is provided in the piston part 14a in order to prevent the escape of pressure medium from the pressure space 15. For this purpose the side surfaces of the piston part 14a with the associated seal 23 which stand in contact with the inner side of the cylinder part 14b are designed in such a manner that the sliding shoe 5 can be tilted relative to the foot 4 without the seal 23 of the piston part 14a and the cylinder 14b coming out of contact and in such a way that it is ensured that the non-sealing part of the piston 14a does not experience direct contact with the cylinder part 14b.

Pressure spaces 16 are provided in the support surface 6 of the sliding shoe 5 for the hydraulic support of the roll jacket 1 and are throttlingly fluidly connected via capillary bores 16 to the pressure space 15 between the sliding shoe 5 and the foot 4.

The guide strips 18 are so formed in this example that they guide the sliding shoes as far as possible in the vicinity of the roll jacket in order to keep any eventual tilting forces small. As a deviation from the design shown in FIG. 3 the guide strips, which can if necessary be formed in one piece with the carrier 2, are executed in such a way that they are drawn up as far as possible in the direction of the roll jacket 1 so that the sliding shoe 5 is supported almost directly adjacent to the roll jacket 1.

In all embodiments of the invention, provision is made that the foot 4 is continually loaded relative to the carrier 2, which, as a rule, takes place by means of a compression spring but which could also be achieved by magnetic means.

Figure 4:
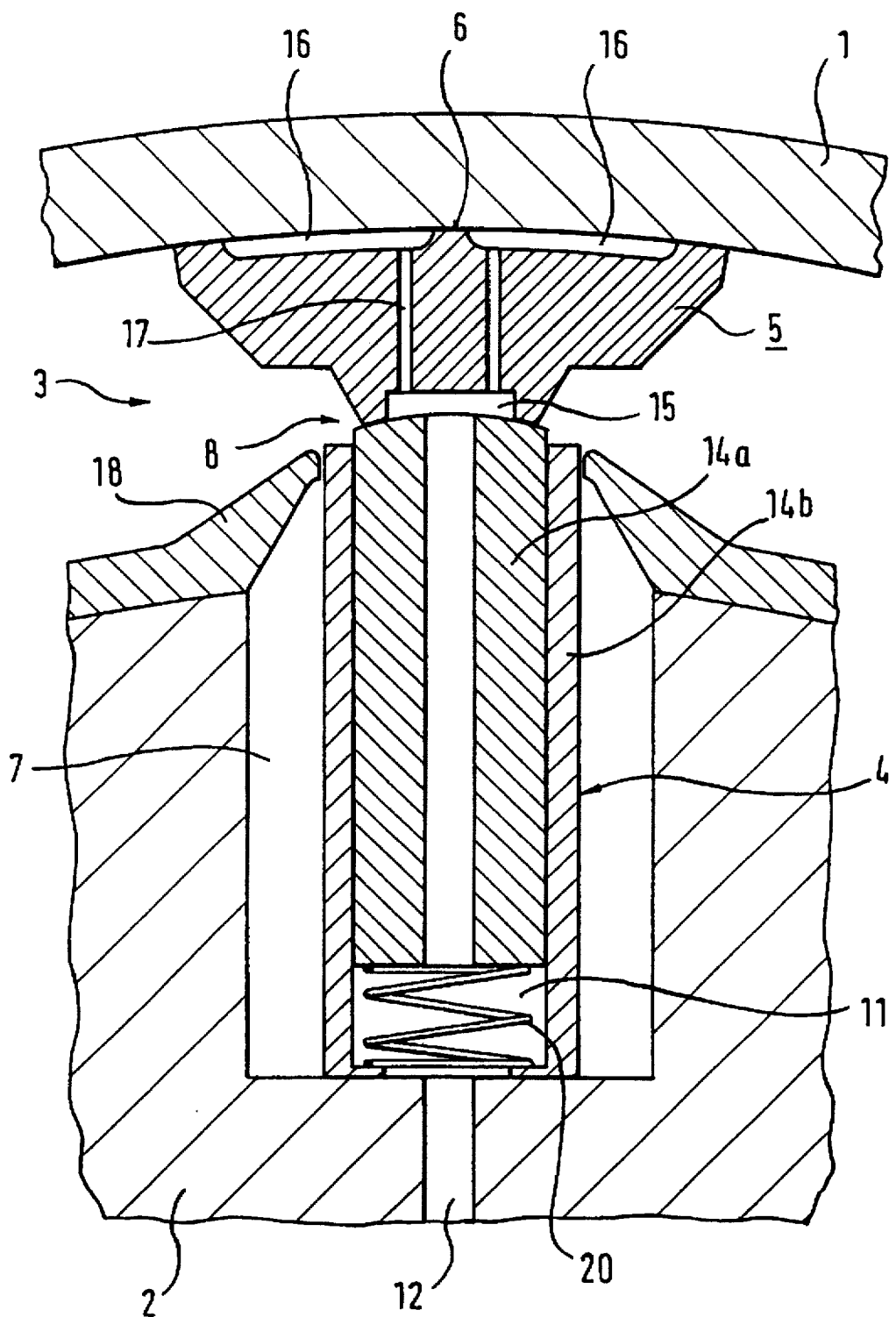
FIG. 4 is a sectional illustration of a partial view of a fourth embodiment of a roll arrangement.

FIG. 4 shows a roll arrangement with a support arrangement 3 provided between a roll jacket 1 and a carrier 2, with the support arrangement consisting essentially of a foot or base part 4 which is supported on the carrier 2 and a sliding shoe 5 with a support surface 6 associated with the roll jacket 1.

The foot 4 is arranged in a recess 7 of the carrier 2 and forms a piston-in-cylinder unit with the carrier 2. The latter includes a cylinder part 14b which is formed in sleeve-like manner and which is supported against the carrier 2. At its roll jacket end the cylinder part 14b is held in the circumferential direction of the roll jacket 1 at both sides by guide strips 18 secured to the carrier 2. A piston part 14a is inserted from the roll jacket side into the cylinder 14b and is held in the latter so that it is displaceable in the radial direction relative to the roll jacket 1. The pressure space 11 of the piston-in-cylinder unit is formed between the piston part 14a, the cylinder 14b, and the carrier 2 and is connected to a pressure medium bore 12 extending in the carrier 2.

The stressing unit furthermore includes a compression spring 20 which is provided in the pressure space 11 and is braced between the piston part 14a and the cylinder part 14b and prestresses the piston-in-cylinder unit in an expanding sense.

A tilting support 8 is provided between the foot 4 and the sliding shoe 5 and is formed by the complementarily shaped spherical support surfaces at the roll jacket end of the piston part 14a and the carrier side end face of the sliding shoe 5.

The piston part 14a of the foot 4 and the sliding shoe 5 form a pressure space 15 in the region of the tilting support 8, with the pressure space 15 standing in connection with the pressure space 11 provided between the foot 4 and the carrier 2. The working surfaces of the two pressure spaces 11, 15 are so dimensioned and matched to one another that the surface pressure between the support surfaces of the tilting support 8 are low and an undesired loss of pressure medium from the pressure space 15 is not possible.

Pressure pockets 16 are provided in the support surface 6 of the sliding shoe 5 which are restrictedly connected via capillary bores 17 with the pressure space 15 between the sliding shoe and the foot 4.

Figure 5:
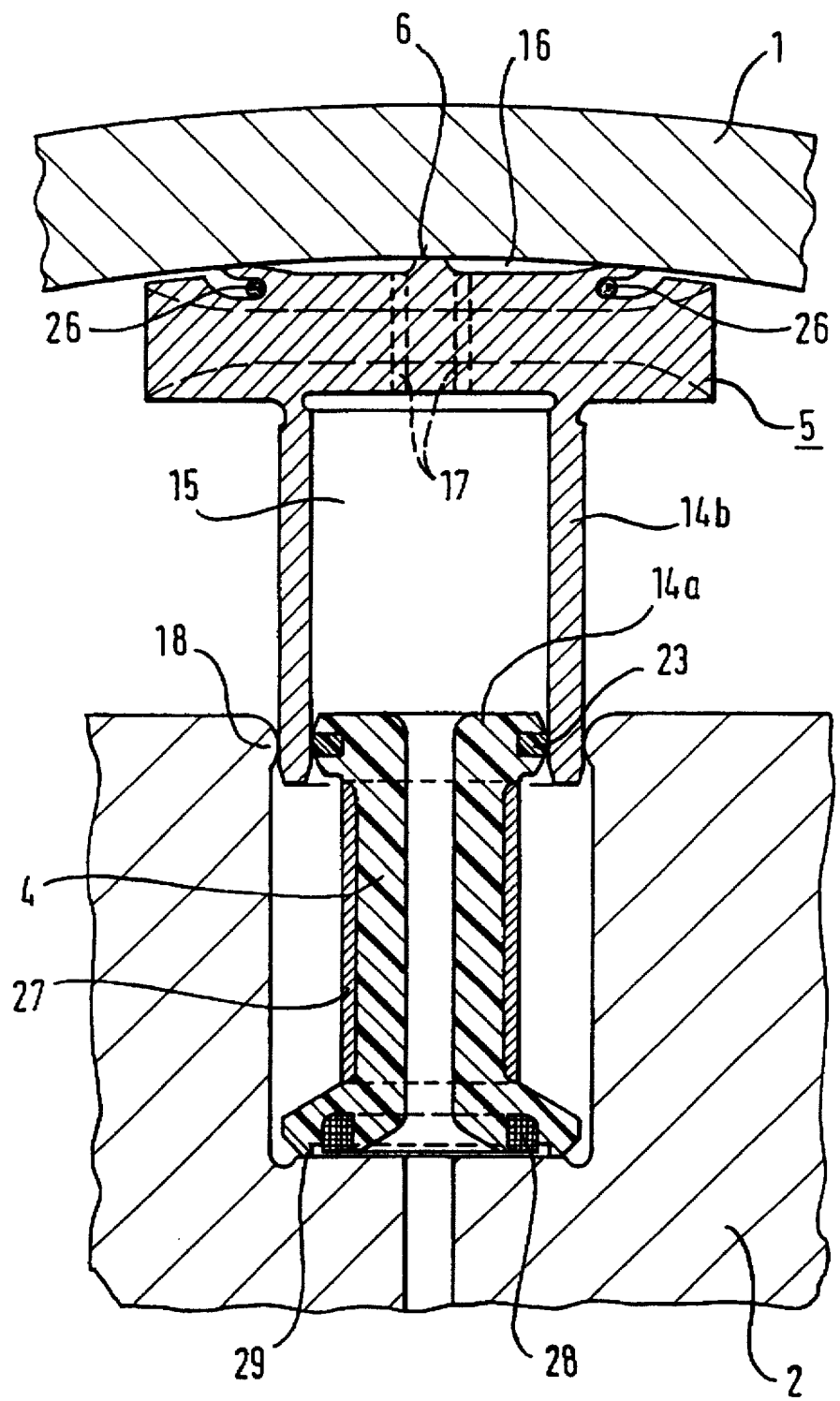
FIG. 5 is a sectional illustration to explain a fifth embodiment of a roll arrangement

The embodiment of FIG. 5 corresponds with respect to the basic layout to the embodiment of FIG. 3. In place of a compression spring 20 which permanently biases the foot 4 relative to the carrier 2, and which is preferably arranged in the embodiment of FIG. 3 in the space 15, the foot of the arrangement of FIG. 5 has a permanent magnet 28 which is arranged in the foot at the base end and which ensures that the foot is continually held against the corresponding contact surface of the carrier 2 and indeed while forming a sealing lip 29.

The foot thereby consists of a plastic part which is cast onto a metal tube 27.

In the region of the sliding shoe 5 there is shown an advantageous embodiment of a mutual connection of several adjacent sliding shoes which border on one another in the axial direction and/or in the circumferential direction, or can have a fixed spacing from one another. This connection is preferably achieved by means of a tensioning wire 26 extending around them which is executed in the manner of an endless loop.

In operation the support arrangements 3 shown in FIGS. 1 to 5 are pressurized with a pressure medium, for example with a hydraulic oil, via pressure medium bores 12 extending in the carrier 2 in such a way that the piston-in-cylinder units are expandingly preloaded and the sliding shoe 5 is pressed relative to the carrier 2 against the roll jacket 1.

The pressure medium is also supplied via the connection bores 17 to the pressure pockets 16 in the support surface 6 of the sliding shoe 5 in order to hydrostatically support the roll jacket 1.

When a roll jacket 1 is deformed in operation the sliding shoe 5 can adapt to these deformations, with the deformations being compensated by displacement movements of the foot 4 relative to the carrier 2 and by tilting movements which the sliding shoe 5 can execute relative to the carrier 2 in the region of the tilting support 8. In this way it is ensured that the support surface 6 remains fully in contact with the roll jacket 1, even when the latter deforms. The points of contact of the guide strips 18 at the support arrangement 3 form a bearing point centrally between them about which the sliding shoe 5 can undergo a pivotal movement relative to the carrier 2. This bearing point should be selected to be as close as possible to the roll jacket 1 in order to give the support arrangement 3 high stability.

The sliding shoes are thereby arranged in gap-free manner or with a predetermined fixed spacing from one another.

The piston-in-cylinder units can be both hydraulically and also pneumatically loaded and it is likewise possible to support the roll jacket hydrodynamically instead of hydrostatically. In the latter case the lubricating fluid must not come from the pressure space of a piston-in-cylinder unit but can rather also be separately supplied.

With hydrostatic support of the jacket 1 on the sliding shoes 5 the fluid provided for this purpose can also have a separate supply, i.e. different pressure sources can be used for the hydrostatic support, on the one hand, and for the pressing of the sliding shoe 5 against the jacket 1, on the other hand.

Likewise it is not compulsory to provide the fluid supply via the bore 12 out of the carrier 2.

What is claimed is:

1. A roll arrangement comprising a rotatable roll jacket, in particular an elastic roll jacket, a rotationally fixed carrier and at least one support arrangement disposed between the roll jacket and the carrier, the support arrangement having a foot associated with the carrier and a sliding shoe mounted on the foot and movable in the radial direction relative to the roll jacket, the sliding shoe having a support surface associated with the roll jacket, wherein the foot is displaceably supported at the carrier and the support arrangement is of at least two-part construction and contains a tilting support which permits a tilting of the sliding shoe relative to the carrier.

2. A roll arrangement in accordance with claim 1, wherein at least one guide is provided which forms an abutment which prevents the support arrangement being taken along in the direction of rotation of the roll jacket.

3. A roll arrangement in accordance with claim 2, wherein the guide acts on the support arrangement at a jacket side.

4. A roll arrangement in accordance with claim 1, wherein a first pressure space is formed between the foot and the sliding shoe and a second pressure space which is connected to the first pressure space is formed between the foot and the carrier, and wherein the effective areas of the two pressure spaces are so dimensioned and matched to each other, that at least the surface pressure between the foot and the carrier is relieved.

5. A roll arrangement in accordance with claim 4, wherein an amount of surface pressure between the foot and the carrier that is relieved is selected such that a lubricant film forms between the foot and the carrier.

6. A roll arrangement in accordance with claim 1, wherein a stressing or loading unit is provided in the support arrangement and includes a hydraulically or pneumatically energizable piston-in-cylinder unit.

7. A roll arrangement in accordance with claim 6, wherein the piston-in-cylinder unit is provided between the foot and the sliding shoe.

8. A roll arrangement in accordance with claim 6, wherein the piston-in-cylinder unit is provided between the foot and the carrier.

9. A roll arrangement in accordance with claim 6, wherein the tilting support or bearing is formed between the piston part and the cylinder part of the piston-in-cylinder unit.

10. A roll arrangement in accordance with claim 7, wherein the tilting support is provided in the foot.

11. A roll arrangement in accordance with claim 8, wherein the tilting support is provided in the foot.

12. A roll arrangement in accordance with claim 10, wherein the tilting support subdivides the foot into a sliding foot which is displaceably supported on the carrier and a component which is coupled to the sliding shoe.

13. A roll arrangement in accordance with claim 12, wherein the sliding foot is formed as a thin-walled sleeve.

14. A roll arrangement in accordance with claim 8, wherein the tilting support is provided between the foot and the sliding shoe.

15. A roll arrangement in accordance with claim 1, wherein the support arrangement has an element which expandably preloads the support arrangement.

16. A roll arrangement in accordance with claim 15, wherein the element is a compression spring.

17. A roll arrangement in accordance with claim 1, wherein the roll jacket is hydrostatically or hydrodynamically supported by the support arrangement.

18. A roll arrangement in accordance with claim 17, wherein pressure pockets are provided in the support surface of the sliding shoe which are preferably connected with the pressure space of a piston-in-cylinder unit of the support arrangement.

19. A roll arrangement in accordance with claim 6, wherein the sources for the hydrostatic or hydrodynamic lubrication and for the pressurization of the pressure space of the piston-in-cylinder unit are separate from one another.

20. A roll arrangement in accordance with claim 6, wherein the oil supply to the piston-in-cylinder unit takes place directly via a bore in the carrier.

21. A roll arrangement in accordance with claim 6, wherein the oil supply to the piston-in-cylinder unit does not take place form the carrier.

22. A roll arrangement in accordance with claim 1, wherein the sliding surface for the support arrangement provided on the carrier is of flat design.

23. A roll arrangement in accordance with claim 1, wherein the sliding surface for the support arrangement provided on the carrier has a radius of curvature which has its center point at the center between the guide strips.

24. A roll arrangement in accordance with claim 1, wherein a plurality of support arrangements are arranged alongside one another in the axial and/or circumferential direction.

25. A roll arrangement in accordance with claim 24, wherein the support arrangements are arranged with gaps between them and/or staggered relative to one another, e.g. in the manner of the bricks of a brick wall.

26. A roll arrangement in accordance with claim 1, wherein the support arrangements can be pressurized with either the same pressure or alternatively with different pressures.

27. A roll arrangement in accordance with claim 1, wherein one of the support arrangements is non-displaceably arranged as a fixed point.

28. A roll arrangement in accordance with claim 1, wherein the sliding shoes are of planar, convex or concave shape.

29. A roll arrangement in accordance with claim 1, wherein a flexible cloth is provided as the roll jacket which takes on the contour of the respective counter-roll.

30. A roll arrangement in accordance with claim 1, wherein the foot is held against the carrier by means of a permanent magnet.

31. A roll arrangement in accordance with claim 1, wherein a plurality of sliding shoes are held together by means of a clamping wire which extends around them and forms an endless loop.

32. A roll arrangement in accordance with claim 2, wherein the at least one guide is a strip-like guide.

33. A roll arrangement in accordance with claim 4, wherein the second pressure space is connected to the first pressure space in a restriction-free manner.

34. A roll arrangement in accordance with claim 27, wherein the support arrangement located at the center of the roll is said one of the support arrangements that is non-displaceably arranged as a fixed point.

* * * * *